Figure 1:
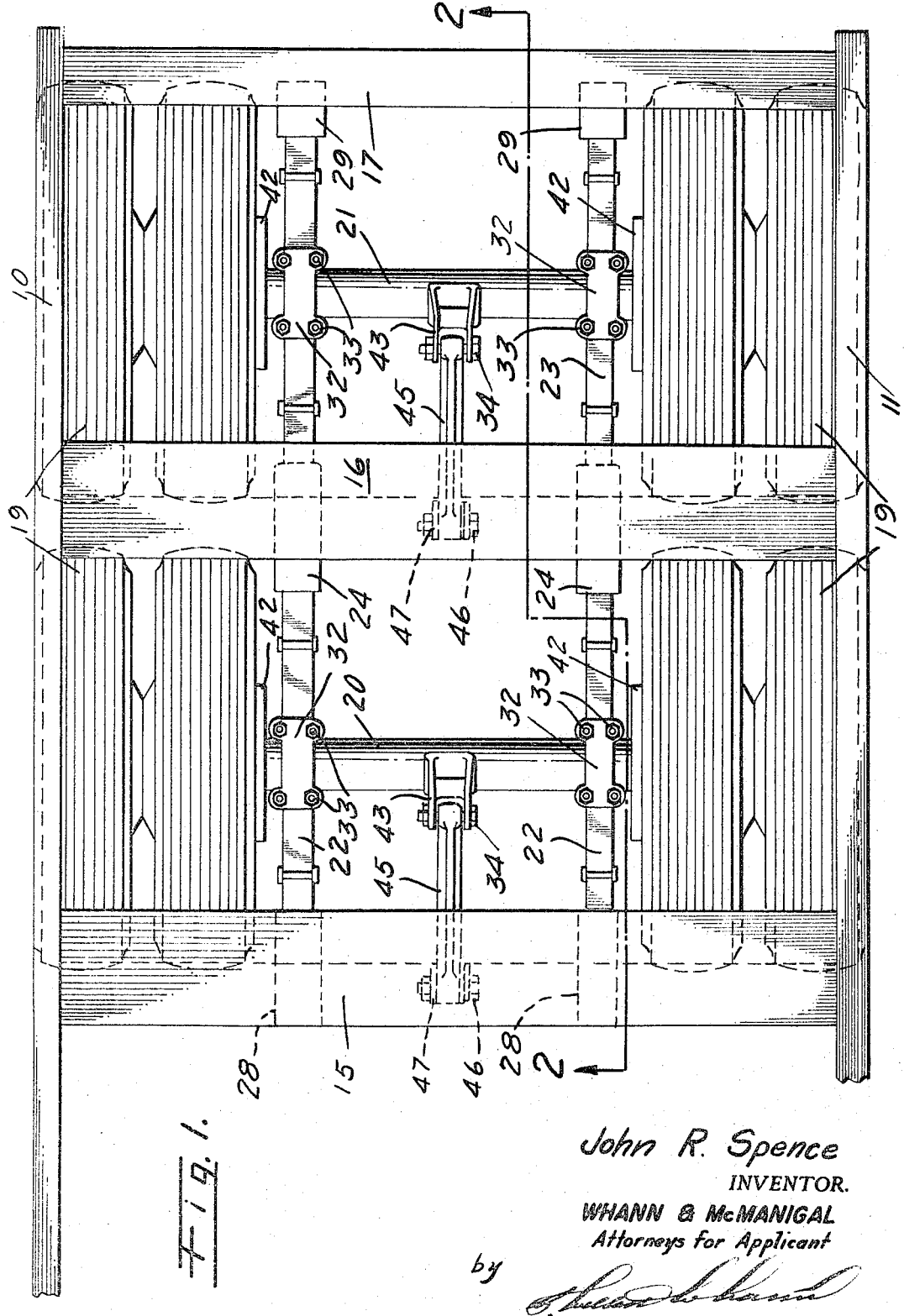

March 14, 1967  J. R. SPENCE  3,309,106
SUSPENSION FOR VEHICLE BODY
Filed Jan. 19, 1965  2 Sheets-Sheet 1

John R. Spence
INVENTOR.
WHANN & McMANIGAL
Attorneys for Applicant
by

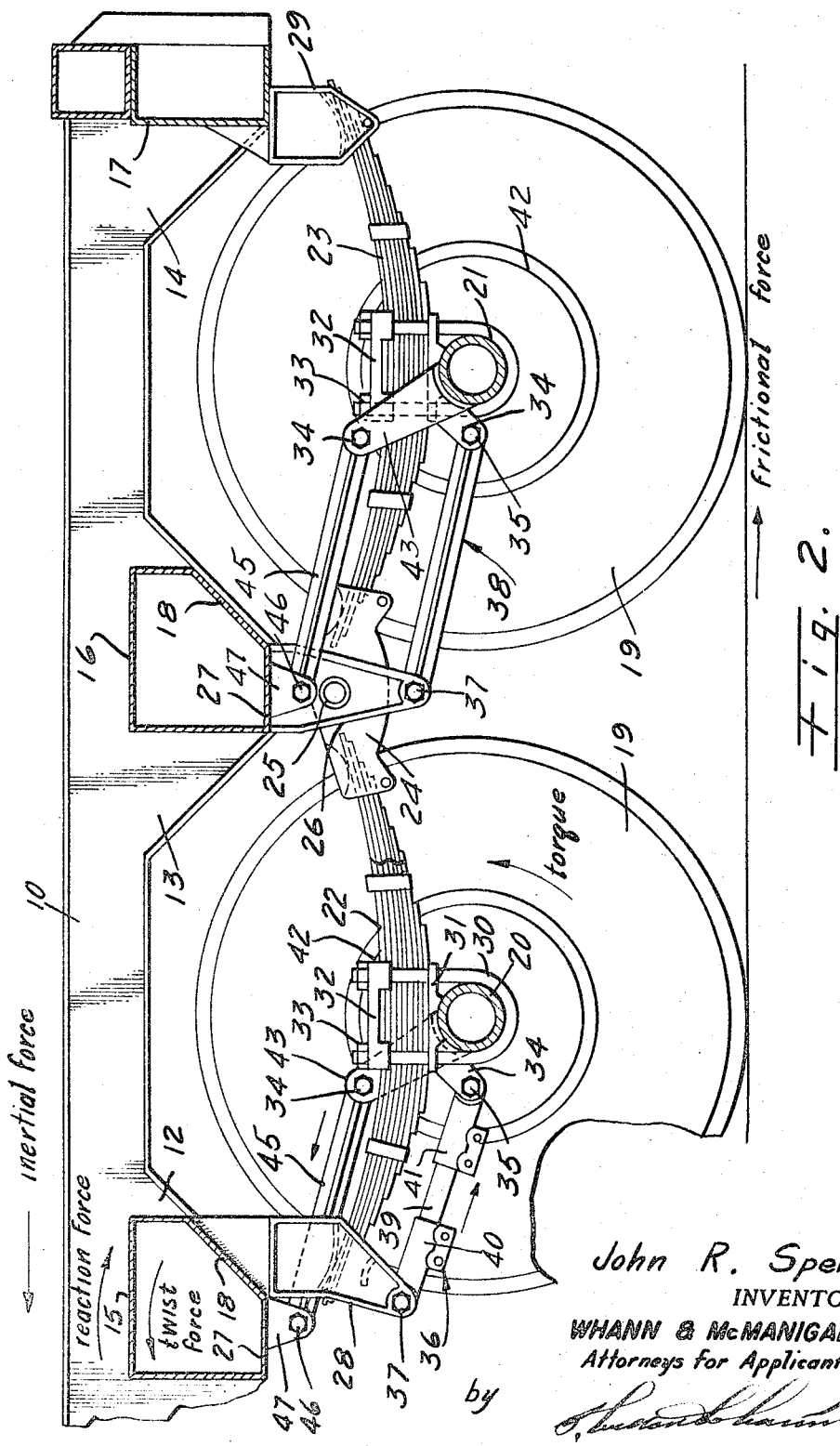

United States Patent Office 3,309,106
Patented Mar. 14, 1967

3,309,106
SUSPENSION FOR VEHICLE BODY
John R. Spence, San Pedro, Calif., assignor to Pike Trailer Co., Los Angeles, Calif., a co-partnership
Filed Jan. 19, 1965, Ser. No. 426,646
9 Claims. (Cl. 280—104.5)

The present invention relates generally to suspension systems for trailers and other roadway vehicles, and is more particularly concerned with improved suspension means which will act as a modulator and absorber between road shock vibrations, axle brake torque forces and the trailer body which may take different forms such as a trailer van shell or flat bed frame rail.

Heretofore, and particularly in semi-trailers the road wheels were journalled upon axles yieldably carried by a spring suspension system which was incorporated in a subframe or under-carriage. The conventional subframe was of less width than the main body of the vehicle and included a pair of laterally spaced side rails or plates which extended longitudinally of the trailer and provided rigid unyielding supports for the brackets utilized in attaching the axle supporting springs, the anchored ends of radius rods, and the torque arm connecting links. With an arrangement as above described, there are inherent and undesirable characteristics which include that due to unyielding rigidity of the side rails comprising the subframe structure. These side rails conduct the road vibrations and shocks as well as torque forces created in the suspension, directly to the trailer body in such a manner that the forces tend to become reinforcing towards the forward spring hangers.

Having in mind the inherent disadvantages of conventional suspension systems as utilized with subframes such as described above, it is a broad concept of the present invention to eliminate the narrow subframes and provide main rails at the sides of the trailer body, these rails being interconnected by force and vibration absorbing torsion structures which carry the spring brackets, and to which the radius rods, torque rods, etc., are connected. These torsion structures are independent of the body flooring and act as modulators between the road shock vibrations, axle brake torque forces and other forces created in the suspension system, and the body of the trailer.

Another object of the herein described invention is to provide as a part of the main body supporting framework contoured high tensile steel tubes which run laterally beneath and independent of the body floor to act as a modulator. The modules have the characteristic of a monocoque structure, and that is the ability to work at high stresses and extreme displacements without reaching yield point. These modulators form modules which isolate impact vibrations by consistent deformation over large surface areas of the tube which distributes the resulting stress and passes on a muted reaction to the body of the trailer.

A further object of the invention is to provide in a suspension system, particularly utilizing tandem axles, wherein the modulators transfer brake torque from each axle to the body independent of one another. Such arrangement enables each axle to "dig-in" on emergency stops without counter lifting action from the second axle. Thus, the greater the torque and resulting torsional flexing of the modulator, the more tendency the trailer has to hug the ground.

Another object is to provide a suspension arrangement or system wherein subframes will be eliminated together with their disadvantages. For example, in the conventional, longitudinal, subframe rails the axle torques interact with each other through these common members so as to cause instability and lifting effects which lead to brake chatter.

Still another object is to provide modules which operate as independent stabilizers spanning the full width of the body. The modulators thus act as torsion members which allow only a minimum rotational movement. Thus side sway is completely dependent on the suspension. In the conventional arrangement having centrally located rails, it is necessary to attach cross sills to act as outriggers as well as floor supports. The high degree of rotational deflections with this type of construction, particularly on turns, decreases lateral stability and tire clearance. Moreover, the constant flexing of sills over the suspension with every impact, brake application, or turn tends to loosen floor attachments. These inherent disadvantages have been overcome by the herein described invention.

Further objects of the invention will be brought out in the following part of the specification wherein detailed description is for the purpose of fully disclosing the invention without placing limitations thereon.

Referring to the accompanying drawings, which are for illustrative purposes only:

FIG. 1 is a fragmentary plan view of a trailer frame structure according to the present invention for supporting a tandem axle suspension system; and FIG. 2 is a fragmentary sectional view showing details of the suspension system and the manner of supporting from frame torsion members, taken substantially on line 2—2 of FIG. 1.

Referring more specifically to the drawings, for illustrative purposes, there is shown a rearward portion of a trailer frame structure which may be utilized in flat or platform trailers as well as van type trailers for the suspension system.

More specifically, the main frame structure according to the present invention comprises main frame side rails 10 and 11 which are positioned substantially at the extreme sides of the trailer body and extend longitudinally of the trailer, these side rails being positioned substantially above the outermost ground wheels, rather than inwardly of the wheels as in conventional practice. The side rails form longitudinally extending beams or supports upon which the trailer body and flooring may be directly mounted, while at spaced intervals the side rails are provided with downwardly extending plate portions as shown at 12, 13 and 14. These plate portions are in transverse alignment and provide supports to which the opposite ends of modules 15 and 16 are rigidly secured as by welding. At the rear end of the framework, a transversely extending end frame of rigid construction is secured between the plate portions 14—14 at opposite sides of the frame.

The modules as shown in FIG. 2 are of tubular construction, and in this case have a substantially rectangular wall section except for a truncated corner wall 18 in each case. These transverse modules form tubes of high tensile steel which extend transversely beneath and independent of the trailer floor and serve as torsion structures to modulate and absorb road shock vibrators, axle brake torque forces as well as other forces which might otherwise be transmitted to the trailer body. These modules have the characteristic of monocoque structures in that they have the ability to work at high stresses and extreme displacements without reaching yield point.

It is an important concept of the present invention that the modules 15 and 16 together with the transverse end frame member 17 provide the frame structure from which the suspension system is suspended, rather than to have the suspension system suspended from longitudinally extending rail members as is conventional with trailer construction conventionally utilizing subframe or undercarriages.

As shown in FIG. 2 the suspension in this case comprises tandem road wheels 19—19 journaled upon axles 20 and 21. As will be apparent by reference to FIG. 2, the trailer load is transmitted to the tandem axles 20 and 21 through companion leaf springs 22 and 23 disposed in tandem relative at opposite sides of the body frame structure. In order to equalize the weight load which is imposed upon the tandem axles, the adjacent ends of the leaf springs 22 and 23 at each side of the suspension are supported in an equalizer rocker bracket 24 of conventional construction with a central fulcrum pivot 25 on a depending bracket 26 having its uppermost end secured to a bottom wall 27 of module 16. The equalizer rocker brackets at the opposite sides of the trailer frame pivot independently so as to equalize the load at opposite sides by independent action. The outer ends of the leaf springs 22 are supported in fixed hanger brackets 28 in each case secured to the corner wall 18 of module 15, while the outer ends of leaf springs 23 are respectively supported in hanger brackets 29 secured to and depending from end frame 17.

Each leaf spring 22 and 23 is centrally connected to its associated axle by means of U-bolts 30 positioned on opposite sides of the spring and surrounding the associated shaft, the U-bolts have their end portions extending upwardly through suitable apertures in a lower block member 31 which forms a seat for the underside of the spring, and a top pad member 32 which bears against the top of the leaf spring when held in clamping engagement by securing nuts 33 in threaded engagement with the ends of the U-bolts. The block member 31 in each case includes a forwardly extending short downwardly inclined bracket 34. In the case of forward axle 20, the bracket 34 is connected by a pivot 35 to one end of a radius or lower torque rod as generally indicated at 36, the other end of this rod being connected through a pivot 37 with the outer end of the fixed hanger bracket 28 in each case. Similarly at the axle 21, the bracket 34 is connected by a pivot 35 to one end of a radius or lower torque rod as generally indicated at 38, this rod having its other end connected by a pivot 37 to the outer end of the bracket 26. Thus the lower torque rods are located below the leaf springs 22 and 23 in substantially vertical planes and permit the axles to swing in a generally vertical arc in response to spring action and serve to maintain the axles in proper alignment with the frame structure, with the ends of the springs properly seated within their hangers and the equalizer brackets. As is the customary practice, the lower torque rods on the curb side of the road are usually made of fixed length as shown at 38 for the axle 21 in FIG. 2, while the rods on the road side are usually made adjustable as indicated at 36 for the axle 20. Various arrangements may be made for adjusting the rod length. For example, a rod section 39 may have threaded ends adjustably secured in end clamp nuts 40 and 41 which are respectively connected by the pivots 37 and 35.

It is the practice to provide trailers with a braking system which usually is air operated to move braking shoes or other friction means anchored to the axle into braking and non-braking engagement with a brake drum as indicated at 42 and carried by each wheel. When the brake is applied, a braking torque is developed which tends to rotate the axles. These torque forces appear in a torque arm 43 in the form of a radially extending bracket which is secured as by welding or otherwise at its innermost end to the central portion of the axle in a forwardly upwardly extending position as shown in FIG. 2. The outer end of the torque arm is connected by a pivot 34 to one end of an upper torque rod 45 having its other end connected by a pivot 46 to a depending short bracket 47 on the bottom wall 27 of module 15 for the forward axle 20, and bottom wall 27 of the module 16 for the rear axle 21. By reference to FIG. 2, it will be observed that the two upper torque rods are in vertical substantially parallel relation to the lower torque rod. Thus, the shaft is virtually free for vertical displacement, but rotation due to braking is geometrically impossible. By placing the upper torque rod connection in the center of each modulator, the brake torsion forces are symmetrically distributed to the module for absorption and transmission to the lower torque rods.

By reference to FIG. 2, arrows have been applied to indicate the direction of forces in the torque rods. During braking, the forces acting through the lower torque rods will be greater than in the upper torque rods, and apply a twisting force as indicated to the torsion modules 15 and 16. These twisting forces create reaction forces in the opposite direction which are transmitted in greatly muted and minimized amounts to the main frame structure. Moreover, since the braking torque forces are independently absorbed and modulated for each of the tandem axles, reinforcing build-up towards the forward spring hanger is substantially eliminated. It will also be appreciated that in acting as independent stabilizers spanning the full width of the body frame, the modulators result in greater stability and reduction of side sway to a minimum. Overall weight is reduced by elimination of the subframe. From the above description of the invention, it is clearly apparent that the stated objects of the invention will be accomplished.

Various modifications may suggest themselves to those skilled in the art without departing from the spirit of my invention, and hence, I do not wish to be restricted to the specific form shown or the uses mentioned, except to the extent indicated in the appended claims.

I claim:
1. Suspension means for a vehicle body, comprising:
 (a) a body frame structure including a pair of transverse extending torsion members in spaced apart relation longitudinally of the vehicle body, each of said members having its opposite ends rigidly anchored; and
 (b) a transversely extending axle spring supported from said torsion members in a position therebetween at points on said torsion members inwardly spaced from their anchored ends, said axle mounting road engaging wheel structures at its ends.
2. Suspension means for a vehicle body, comprising:
 (a) a body frame structure including a pair of transverse extending torsion members in spaced apart relation longitudinally of the vehicle body, each of said members having its opposite ends rigidly anchored in the body frame structure;
 (b) a transversley extending axle spring supported from said torsion members in a position therebetween, said axle mounting road engaging wheel structures at its ends; and
 (c) means including a connection for transmitting axle torque forces to a point between the ends of one of said torsion members for modulation and absorption thereby.
3. Suspension means for a vehicle body, comprising:
 (a) a body frame structure including a pair of transversely extending frame members in spaced apart relation longitudinally of the vehicle body, each of said members having its opposite ends respectively rigidly anchored in the body frame structure, one of said members comprising a torsion member;
 (b) a transversely extending axle spring supported from said transverse frame members in a position therebetween, said axle mounting road engaging wheel structures at its ends including braking mechanisms interconnecting the wheels and axle; and
 (c) means including a connection for transmitting axle torque forces to a point between the ends of said torsion member for modulation and absorption thereby.

4. Suspension means for a vehicle body, comprising:
(a) a body frame structure including a pair of transverse extending torsion members in spaced apart relation longitudinally of the vehicle body, each of said members having its opposite ends rigidly anchored in the body frame structure;
(b) road wheels journalled on a transverse axle and including brake mechanisms interconnecting the wheels and axle, said axle being supported at its ends by leaf springs respectively extending between said torsion members, each of said springs having end brackets secured to the adjacent torsion member;
(c) a rod connection between said axle and each of the spring brackets on one of said torsion members for transmitting axle torque forces thereto so as to twist it in one direction; and
(d) a rod connection for transmitting said axle torque forces to a point between the ends of said one of said torsion members so as to twist it in a direction opposite to said one direction.

5. Suspension means for a vehicle body, comprising:
(a) a body frame structure including a pair of transverse extending torsion members in spaced apart relation longitudinally of the vehicle body, each of said members having its opposite ends rigidly anchored in the body frame structure;
(b) road wheels journalled on a transverse axle and including brake mechanisms interconnecting the wheels and axle, said axle being supported at its ends by leaf springs respectively extending between said torsion members, each of said springs having end brackets secured to the adjacent torsion member;
(c) a lower rod connection between said axle and each of the spring brackets on one of said torsion members for transmitting axle torque forces thereto so as to twist it in one direction; and
(d) an upper rod connection for transmitting said axle torque forces to a point between the ends of said one of said torsion members so as to twist it in a direction opposite to said one direction, each of said lower rods being in vertically spaced parallel relation to said upper rod.

6. Suspension means for a vehicle body, comprising:
(a) a body frame structure including a pair of main side rails respectively extending longitudinally along each side of said body;
(b) transverse members extending between said side rails in spaced apart relation longitudinally of said side rails, each of said members having its opposite ends respectively rigidly connected to said rails;
(c) a transversely extending axle spring supported from a pair of said transverse members in a position therebetween at points on said transverse members inwardly spaced from said main side rails, said axle mounting road engaging wheel structures at its ends including braking mechanism between the wheels and axle; and
(d) means including a connection for transmitting axle torque forces to a point between the ends of one of said transverse members for modulation and absorption thereby as a torsion member.

7. Suspension means for a vehicle body, comprising:
(a) a body frame structure including a pair of main side rails respectively extending longitudinally along each side of said body;
(b) tubular transverse torsion members extending between said side rails in spaced apart relation longitudinally of said side rails, each of said members having its opposite ends respectively rigidly connected to said rails;
(c) a transversely extending axle spring supported from a pair of said transverse members in a position therebetween, said axle mounting road engaging wheel structures at its ends including braking mechanism between each wheel and the axle; and
(d) means including a connection for transmitting axle torque forces to a point between the ends of one of said torsion members for modulation and absorption thereby.

8. Tandem spring suspension means for a roadway vehicle having a body, comprising:
(a) a pair of body frame main side rails respectively extending longitudinally along each side of said body;
(b) a pair of transverse torsion members extending between said side rails of said body frame in spaced apart relation longitudinally of said side rails, each of said members having its opposite ends respectively rigidly connected to said rails;
(c) a pair of tandem axles extending transversely beneath said body;
(d) road wheels journaled on said axles and including braking mechanism interconnecting the wheels and associated axles;
(e) tandem leaf springs mounted on said axles at opposite sides of said body;
(f) means for supporting the adjacent ends of the springs for said axles from one of said transverse torsion members as a common member;
(g) means connecting the other ends of the springs of one of the axles to a frame member;
(h) means for connecting the other ends of the springs of the other axle to the other transverse torsion member; and
(i) means including connections respectively for transmitting torque forces from each of said axles to a point between the ends of one of said transverse torsion members for modulation and absorption thereby.

9. Tandem spring suspension means for a roadway vehicle having a body, comprising:
(a) a pair of body frame main side rails respectively extending longitudinally along each side of said body;
(b) a pair of transverse torsion members extending between said side rails in spaced apart relation longitudinally of said side rails, each of said members having its opposite ends respectively rigidly connected to said rails;
(c) a pair of tandem axles extending transversely beneath said body;
(d) road wheels journaled on said axles and including braking mechanism interconnecting the wheels and associated axles;
(e) tandem leaf springs mounted on said axles at opposite sides of said body;
(f) means for supporting the adjacent ends of the springs for said axles from one of said transverse torsion members as a common member;
(g) means connecting the other ends of the springs of one of the axles to a frame member;
(h) means for connecting the other ends of the springs of the other axle to the other transverse torsion member; and
(i) means including connections for transmitting torque forces from said one of the axles to the common transverse torsion member, and connections for transmitting torque forces from said other of the axles to said other transverse torsion member, whereby the torque forces of the axles are independently modulated and absorbed.

References Cited by the Examiner

UNITED STATES PATENTS

| | | | |
|---|---|---|---|
| 2,620,226 | 12/1952 | Jones | 280—104 |
| 3,166,142 | 1/1965 | Frazier | 280—104 |

BENJAMIN HERSH, *Primary Examiner.*

P. GOODMAN, *Assistant Examiner.*